No. 783,085. PATENTED FEB. 21, 1905.
J. F. STEVENS.
BREAD MIXER AND KNEADER.
APPLICATION FILED NOV. 21, 1903.

Witnesses.
H. S. Woods.
J. H. Clarke.

Inventor.
James F. Stevens
By James Shepard.
Atty.

JAMES F. STEVENS, OF PORT CHESTER, NEW YORK.

BREAD MIXER AND KNEADER.

SPECIFICATION forming part of Letters Patent No. 783,085, dated February 21, 1905.

Application filed November 21, 1903. Serial No. 182,109.

*To all whom it may concern:*

Be it known that I, JAMES F. STEVENS, a citizen of the United States, residing at Port Chester, in the county of Westchester and State of New York, have invented a new and useful Machine to be Used for the Mixing and Kneading of Bread, of which the following is a specification.

My invention relates to an improvement in bread mixers and kneaders; and the object of my improvement is efficiency in operation with reference both to the mixing and kneading operations.

Figure 1:
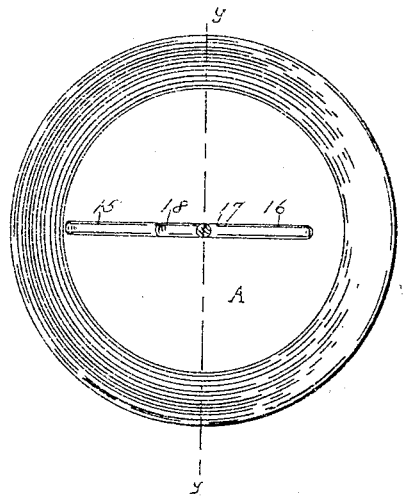
Figure 2:
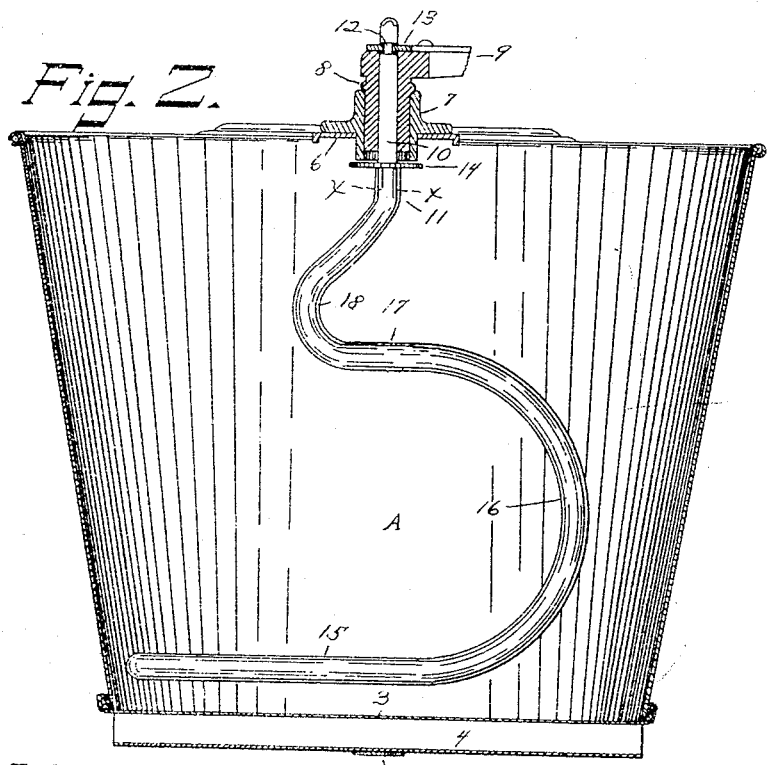

In the accompanying drawings, Figure 1 is a sectional plan of a beater and vessel, the plane of section for the beater being on the line *x x* of Fig. 2. Fig. 2 is an enlarged sectional elevation of the machine on the line *y y* of Fig. 1 with parts broken away and the beater rotated one-quarter of a revolution from the position shown in Fig. 1.

The machine herein shown is made in accordance with some of the features in each of the following patents: to Munson, No. 729,884, June 2, 1903; to Garrigus and Warner, No. 736,956, August 25, 1903, and to Stevens, reissue No. 12,167, November 3, 1903.

A designates the vessel, having underneath the bottom 3 the clamp-receiving socket 4 and feet 5, by means of which socket and clamp (not shown) the vessel may be firmly secured to a table, as in the said Munson patent. At the top of the vessel is the detachable cross-piece or frame 6, having the bearing 7, within which bearing the hub 8 of the crank 9 is journaled, the said hub being axially perforated with an angular hole to receive the angular shank 10 of the beater-shaft 11. The upper end of the said shank is provided with a narrow neck 12 for the engagement of the latch 13, as in the said Garrigus and Warner patent, although as herein shown the crank-hub is detachable from the bearing 7 and the shaft 11 has rigidly secured thereon the flange 14 at a point just below the angular shank.

The beater is composed of a bent rod, with the lower member 15 approximately approaching the bottom 3 of the vessel A and extending over substantially half the diameter thereof in a position parallel to the said bottom. One end of the said lower member merges into an outwardly, upwardly, and inwardly extended bent portion 16, which has sometimes been called the "connecting" member. This bent portion 16 at its greatest diametrical projection falls considerably short of reaching the side of the vessel, thereby leaving an ample working space for the dough to escape and pass by or roll around the said bent portion of the beater. The upper end 17 of the bent portion practically forms the upper part of the beater proper, but as in the Stevens reissue before named there is a short bend 18, extending laterally a short distance at a point between the said upper end 17 and the axial portion of the beater-shaft 11 adjacent to where the said shaft is supported in its bearings. The general form of the beater, consisting of bent rod with a lower member and an outwardly and upwardly and inwardly bent or connecting member, all mounted to rotate on a vertical axis in the cross-bar of a vessel and extend downwardly into the vessel, is old and of itself is not herein claimed. By my improvement the lower member approximately approaches the bottom of the vessel and stands in a parallel position thereto, while the connecting or bent portion which extends upwardly therefrom is remote from the sides of the vessel. The lower member thus related to the vessel is a good device for mixing dough, but such a relation is not an effective one for the kneading operation. Provision, however, is made for an effective kneader by keeping the connecting or bent portion 16 remote from the sides of the vessel, thereby leaving an ample working space between the said portion and side of the vessel for the dough to escape from the beater or pass by it during the kneading operation.

A machine that is both an efficient mixer and efficient kneader is produced in one machine instead of producing one machine that is especially efficient for mixing and another machine that is especially efficient for kneading.

I claim as my invention—

A bread mixer and kneader comprising the combination of a vessel with a rod-like beater mounted to rotate on a vertical axis within the said vessel, the said beater having a connecting portion projecting diametrically relatively to, but less than the working diameter of the vessel, for forming an ample kneading-space between the said bent portion and side of the vessel for the dough to escape during the kneading operation, and having a lower member extending from the lower end of the said bent portion to near the side of the vessel and in proximity to the said bottom for use as a mixing member.

JAMES F. STEVENS.

Witnesses:
 WILLIAM B. PROVOOST,
 JOSEPH A. GAERTNER.